United States Patent
Inoue et al.

(10) Patent No.: US 10,294,979 B2
(45) Date of Patent: May 21, 2019

(54) VEHICLE SEAT

(71) Applicant: TS TECH CO., LTD., Asaka-shi, Saitama (JP)

(72) Inventors: Takayuki Inoue, Reynoldsburg, OH (US); Souheil Hage-Hassan, Reynoldsburg, OH (US)

(73) Assignee: TS TECH CO., LTD., Asaka-shi (JP)

( * ) Notice: Subject to any disclaimer, the term of this patent is extended or adjusted under 35 U.S.C. 154(b) by 69 days.

(21) Appl. No.: 15/331,471

(22) Filed: Oct. 21, 2016

(65) Prior Publication Data

US 2017/0113642 A1 Apr. 27, 2017

Related U.S. Application Data

(60) Provisional application No. 62/245,668, filed on Oct. 23, 2015.

(51) Int. Cl.
| | |
|---|---|
| *B60N 2/68* | (2006.01) |
| *F16B 45/00* | (2006.01) |
| *F16B 2/08* | (2006.01) |
| *B60N 2/803* | (2018.01) |
| *B60N 2/02* | (2006.01) |

(52) U.S. Cl.
CPC .............. *F16B 45/00* (2013.01); *B60N 2/68* (2013.01); *B60N 2/686* (2013.01); *B60N 2/688* (2013.01); *B60N 2/803* (2018.02); *F16B 2/08* (2013.01); *B60N 2002/0264* (2013.01); *B60Y 2306/01* (2013.01)

(58) Field of Classification Search
CPC . F16B 45/00; F16B 2/08; B60N 2/803; B60N 2/68; B60N 2/686; B60N 2/688; B60N 2002/0264; B60N 2002/0244; B60N 2002/0224; B60N 2002/02; B60Y 2306/01
USPC ...................................................... 297/217.3
See application file for complete search history.

(56) References Cited

U.S. PATENT DOCUMENTS

| | | | | |
|---|---|---|---|---|
| 4,614,373 A | * | 9/1986 | Niemeijer | G09F 3/037 292/318 |
| 4,636,006 A | * | 1/1987 | Kazaoka | B60N 2/72 267/142 |
| 6,443,403 B1 | * | 9/2002 | Page | F16L 3/1233 24/16 PB |
| 2002/0050730 A1 | * | 5/2002 | Kondo | B60N 2/002 297/217.3 |
| 2006/0292923 A1 | * | 12/2006 | Tsukamoto | B60R 16/0215 439/501 |
| 2007/0126211 A1 | * | 6/2007 | Moerke | F16B 21/065 280/728.2 |
| 2011/0162885 A1 | * | 7/2011 | Yamaguchi | B60R 16/0215 174/72 A |

(Continued)

FOREIGN PATENT DOCUMENTS

JP 2012-136103 A 7/2012

*Primary Examiner* — Mark R Wendell
(74) *Attorney, Agent, or Firm* — Oliff PLC

(57) ABSTRACT

Disclosed is a vehicle seat including a seat main body in which an electric component is installed, a harness which is disposed along a surface of the seat main body and which is connected to the electric component and a holding member which holds the harness, and a part of the holding member is fixed to the surface of the seat main body and the holding member forms a loop by being extended around along the outer circumference of the harness.

8 Claims, 5 Drawing Sheets

(56) References Cited

U.S. PATENT DOCUMENTS

| | | | |
|---|---|---|---|
| 2011/0308853 A1* | 12/2011 | Schultz | B60R 16/0215 174/70 R |
| 2012/0261527 A1* | 10/2012 | Yamaguchi | B60R 16/0215 248/68.1 |
| 2012/0299359 A1* | 11/2012 | Abe | B60N 2/70 297/452.56 |
| 2015/0165986 A1* | 6/2015 | Morris | B60R 16/0215 280/728.2 |
| 2016/0178089 A1* | 6/2016 | Yadav | B60R 16/0215 248/73 |

* cited by examiner

VEHICLE SEAT

BACKGROUND OF THE INVENTION

1. Field of the Invention

The present invention relates to a vehicle seat.

2. Description of Related Art

Traditionally, there is known a vehicle seat having electric components such as an airbag module, a motor for reclining mechanism and the like installed. Around such vehicle seat, harnesses for supplying power to activate the electric components, sending and reeving control signals and the like are arranged.

These harnesses are inserted in a holder unit which is a fixating member, for example, and are fixated by the fixing member engaging with a frame (for example, see JP 2012-136103).

However, in the Patent Document 1, the number of harnesses increases as the number of electric components installed in the vehicle increases, and the number of fixating members and the like for fixating the harnesses also increases. Further, the structure of the above mentioned fixing member it self is complicated and the workability of harness fixation drops. Therefore, there has been a need to simplify the fixation mechanism of the harnesses.

SUMMARY OF THE INVENTION

In view of the above, an object of the present invention is to provide a vehicle seat whose mechanism for fixating harnesses is simplified.

According to a first aspect of the present invention, there is provided a vehicle seat which includes a seat main body in which an electric component is installed, a harness which is disposed along a surface of the seat main body and which is connected to the electric component and a holding member which holds the harness, and a part of the holding member is fixed to the surface of the seat main body and the holding member forms a loop by being extended around along the outer circumference of the harness.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENT

Figure 1:
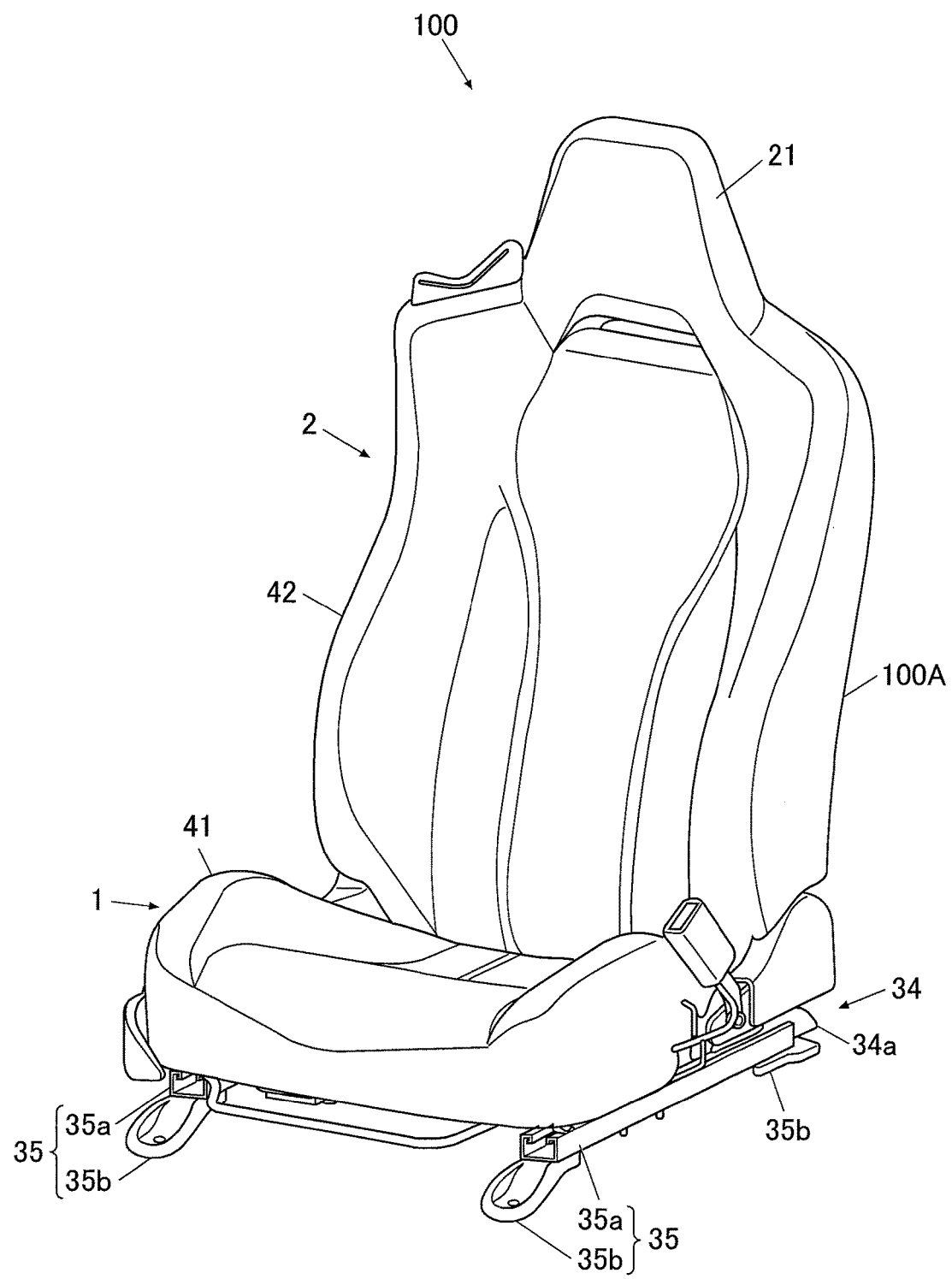
FIG. 1 is a schematic view showing the entire configuration of a vehicle seat according to an embodiment of the present invention.

Hereinafter, an embodiment of the present invention will be described with reference to the drawings. Although the following embodiment includes various limitations which are technically preferred to realize the present invention, the scope of the invention is not limited to the following embodiment and the examples shown in the drawings.

In the following description, the front, back, left, right, up and down directions of the vehicle seat 100 are based on the front, back, left, right, up and down directions seen from a person who sits on the vehicle seat 100.

[Structure of the Vehicle Seat]

Figure 2:
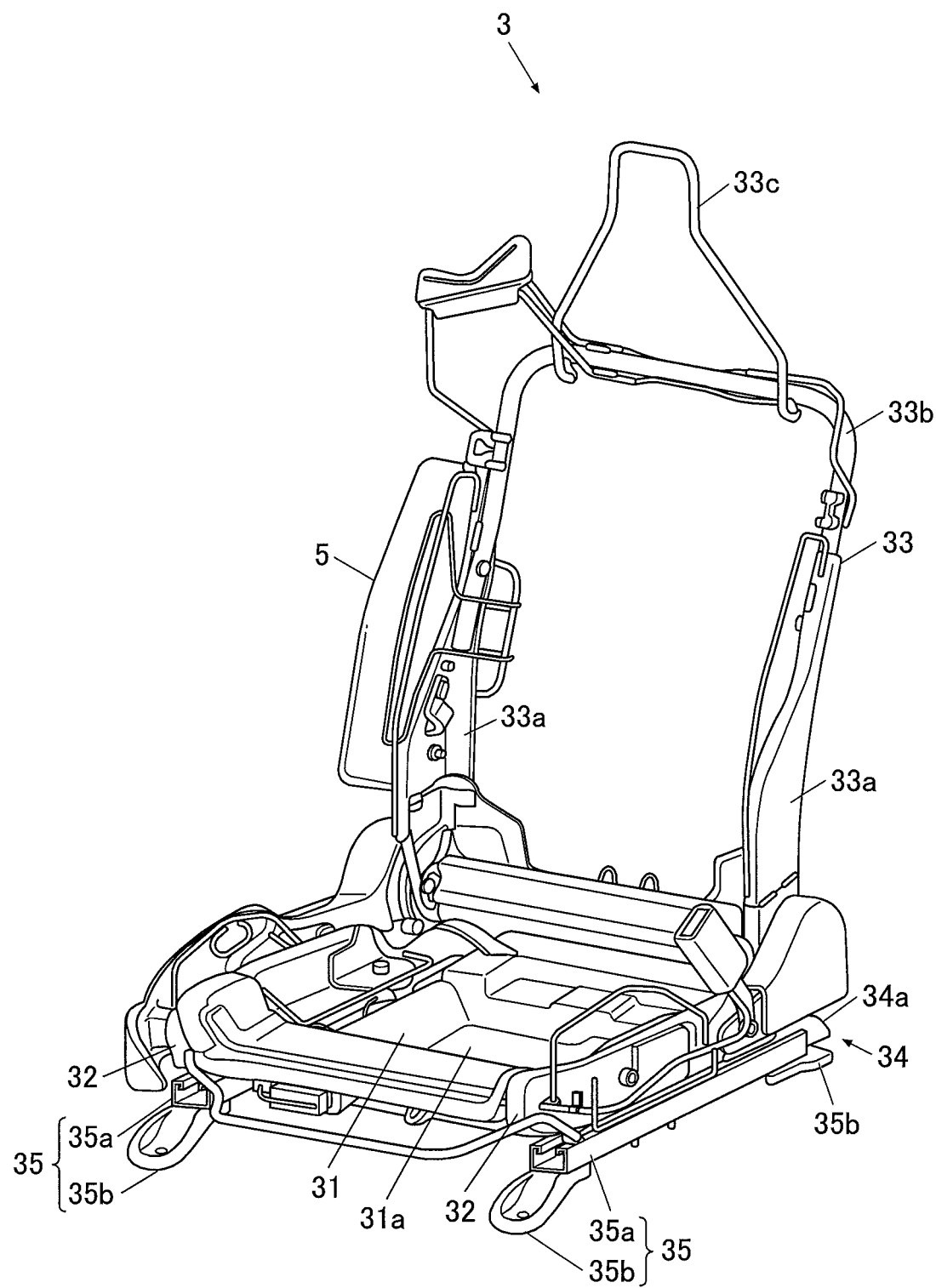
FIG. 2 is a schematic view showing a seat frame of the vehicle seat shown in FIG. 1.

FIG. 1 is a schematic view showing the entire configuration of the vehicle seat 100 according to an embodiment of the present invention and FIG. 2 is a schematic view showing a seat frame 3 of the vehicle seat 100. Further, FIG. 3 is a view of the underside of the vehicle seat 100 seen diagonally from the back.

Figure 3:
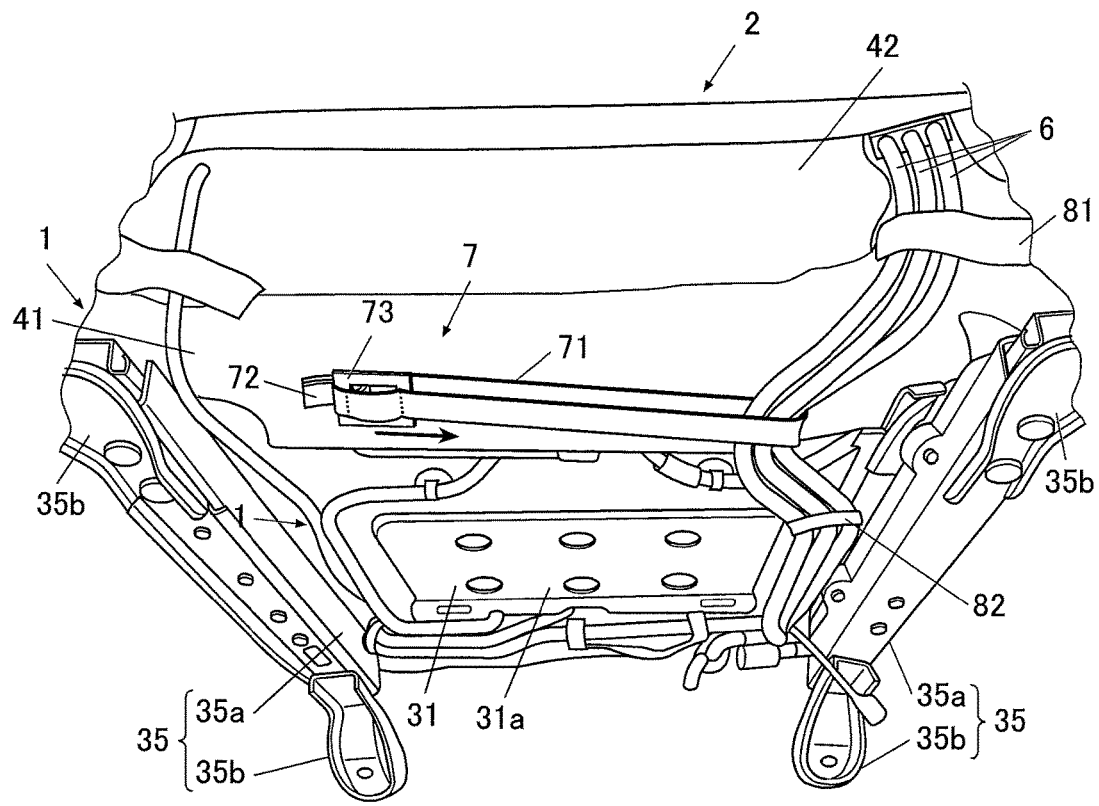
FIG. 3 is a view of the underside of the vehicle seat shown in FIG. 1 when seen diagonally from the back.

As shown in FIGS. 1 to 3, the vehicle seat 100 according to the embodiment includes a seat main body 100A provided with a seat cushion unit 1 on which a passenger sits and a seat back unit 2 having a head rest 21 integrally formed therewith. With respect to the seat cushion unit 1 and the seat back unit 2, cushion pads (not shown) are disposed on the seat frame 3 (see FIG. 2) and the cushion pads are covered with surface materials 41 and 42.

The seat frame 3 includes a pan frame 31, cushion side frames 32 and 32 respectively disposed on the left and right sides of the pan frame 31, the cushion side frames 32 and 32 forming a pair, a seat back frame 33 which is disposed at the back end parts of the cushion side frames 32 and 32 forming a pair, a base frame 34 which is provided under the cushion side frames 32 and 32 forming a pair, and a sliding mechanism 35 for moving the base frame 34 in the front and back directions.

Here, the above mentioned pan frame 31, the cushion side frames 32, the seat back frame 33 and the base frame 34 are formed mainly of a rust proof metal (for example, stainless steel).

The pan frame 31 is for supporting the cushion pad which forms the seat cushion unit 1. The pan frame 31 is formed in a shape where the back side part is indented downward comparing to the front side part. That is, if the vehicle seat 100 is seen from the below (see FIG. 3), a convex part 31a which projects downward is formed at the back side part of the pan frame 31.

At the back end parts of the cushion side frames 32 and 32 forming a pair, the lower end parts of the back side frames 33a and 33a (after-mentioned) of the seat back frame 33, the back side frames 33a and 33a forming a pair, are rotatably attached so that the seat back frame 33 can rotate with respect to the cushion side frames 32 in the direction that allows the upper end part of the seat back frame 33 move in the front and back.

Such rotation of the seat back frame 33 may also be realized by driving a motor for the reclining mechanism which is not shown in the drawings, for example.

The seat back frame 33 includes back side frames 33a and 33a which are respectively disposed on the left and right, the back side frames 33a and 33a forming a pair, and an upper frame 33b formed in a pipe form which is disposed at the upper end parts of the back side frames 33a and which connects the back side frames 33a and 33a forming a pair.

At the back side frame 33a on the right side and the right side part of the upper frame 33b, an airbag module 5 is attached.

With respect to the airbag module 5, although it is not shown in the drawings, if a shock to the vehicle is detected by the shock sensor, a signal from the shock sensor is input to the inflator via a control circuit, the inflator is ignited due to the signal and the airbag inflates instantly by being filled with the gas generated in the inflator.

Further, at the upper frame 33b, a head rest frame 33c which forms the head rest 21 is attached.

The base frame 34 includes long slide frames 34a and 34a which are respectively disposed on the left and right sides along the front-back direction, and the base frame 34 is supported on the sliding mechanism so as to move in the front and back directions via the slide frames 34a and 34a.

Here, although it is not shown in the drawings, a height mechanism for moving the cushion side frames 32 and 32 forming a pair in the up and down directions with respect to the base frame 34 may also be provided.

The sliding mechanism 35 includes left and right slide rails 35a and 35a for individually supporting the left and right slide frames 34a and 34a of the base frame 34, the slide rails 35a and 35a forming a pair, and foot units 35b and 35b for fixing the front and back end parts of the slide rails 35a at their corresponding assembling positions. The sliding of the base frame 34 by the sliding mechanism 35 may be realized by driving a motor for the sliding mechanism which is not shown in the drawings, for example. In such case, a transferring mechanism which converts the power of the motor into the moving force along the front and back directions and which transfers the moving force may also be provided.

As shown in FIG. 3, at the back side and the underside of the vehicle seat 100, a plurality of harnesses 6 which are connected to electric components such as the airbag module 5, various types of motors (not shown) for the reclining mechanism, the sliding mechanism, etc., and the like are disposed.

Here, with respect to the harnesses 6, individual terminals are connected to the electric components and the electronic control unit (not shown). The harnesses 6 further includes cables for power supply and carrying out sending and receiving of control signals and the cables are coated with a coating material having an adequate strength and flexibility in order to prevent the cables from being damaged due to friction with other members.

Three harnesses 6 which are connected to the airbag module 5 and the like are disposed so as to extend to the back surface of the seat back unit 2 from the lower right end part of the seat back unit 2 and so as to extend along the right side part of the underside surface of the seat cushion unit 1. The other ends of the harnesses 6 which are not connected to the airbag module 5 are connected to the electronic control unit which is not shown in the drawings.

These three harnesses 6 are held by the holding member 7.

Here, the holding member 7 will be described in detail with reference to FIG. 4.

Figure 4:
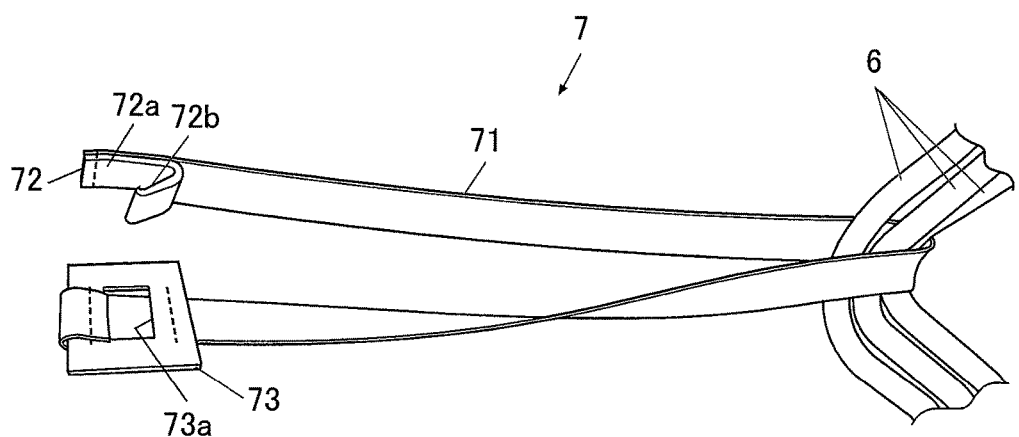
FIG. 4 is an enlarged view of a holding member of the vehicle seat shown in FIG. 1.
Figure 5:
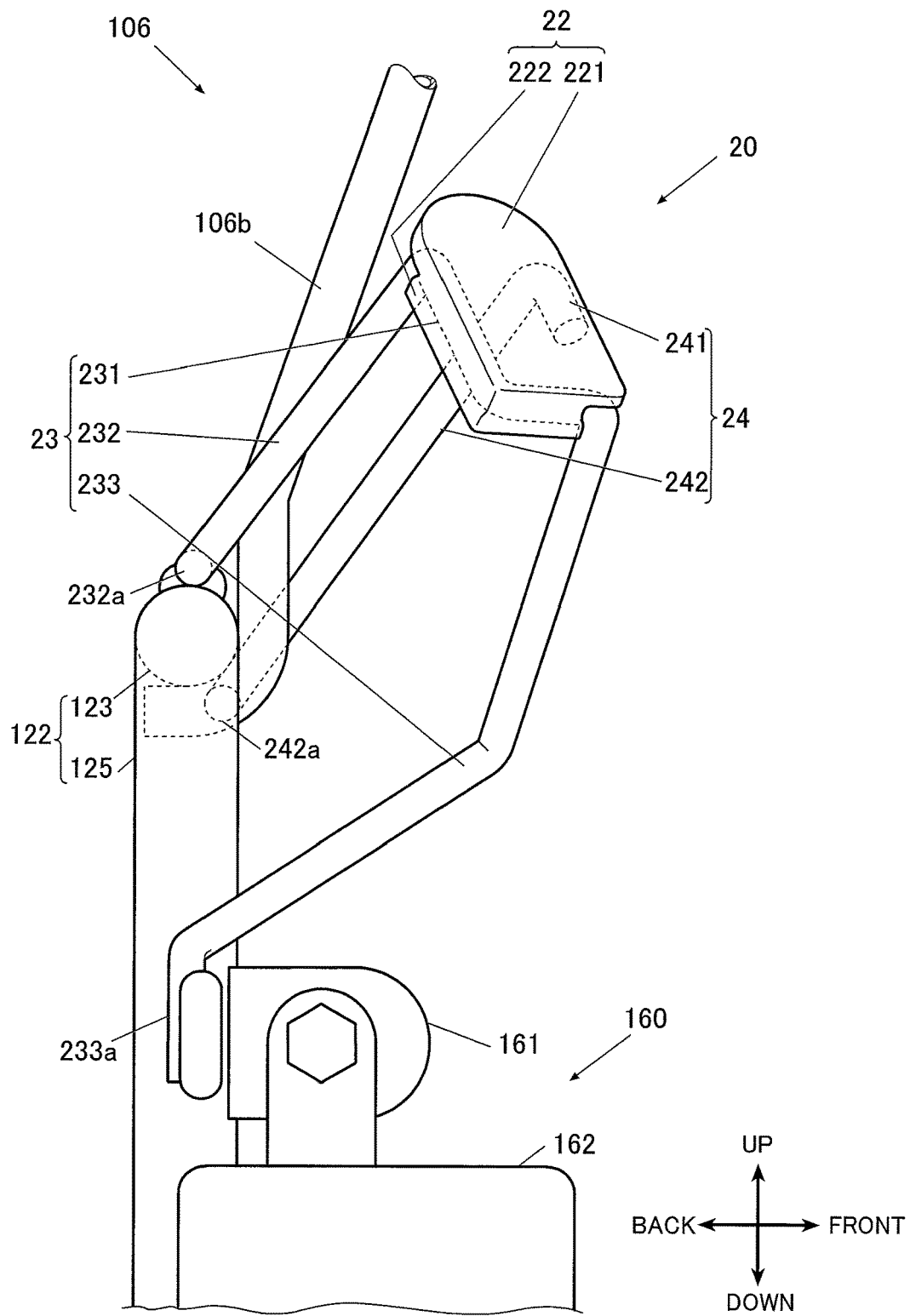
FIG. 5 is a side view of a belt guide.
Figure 6:
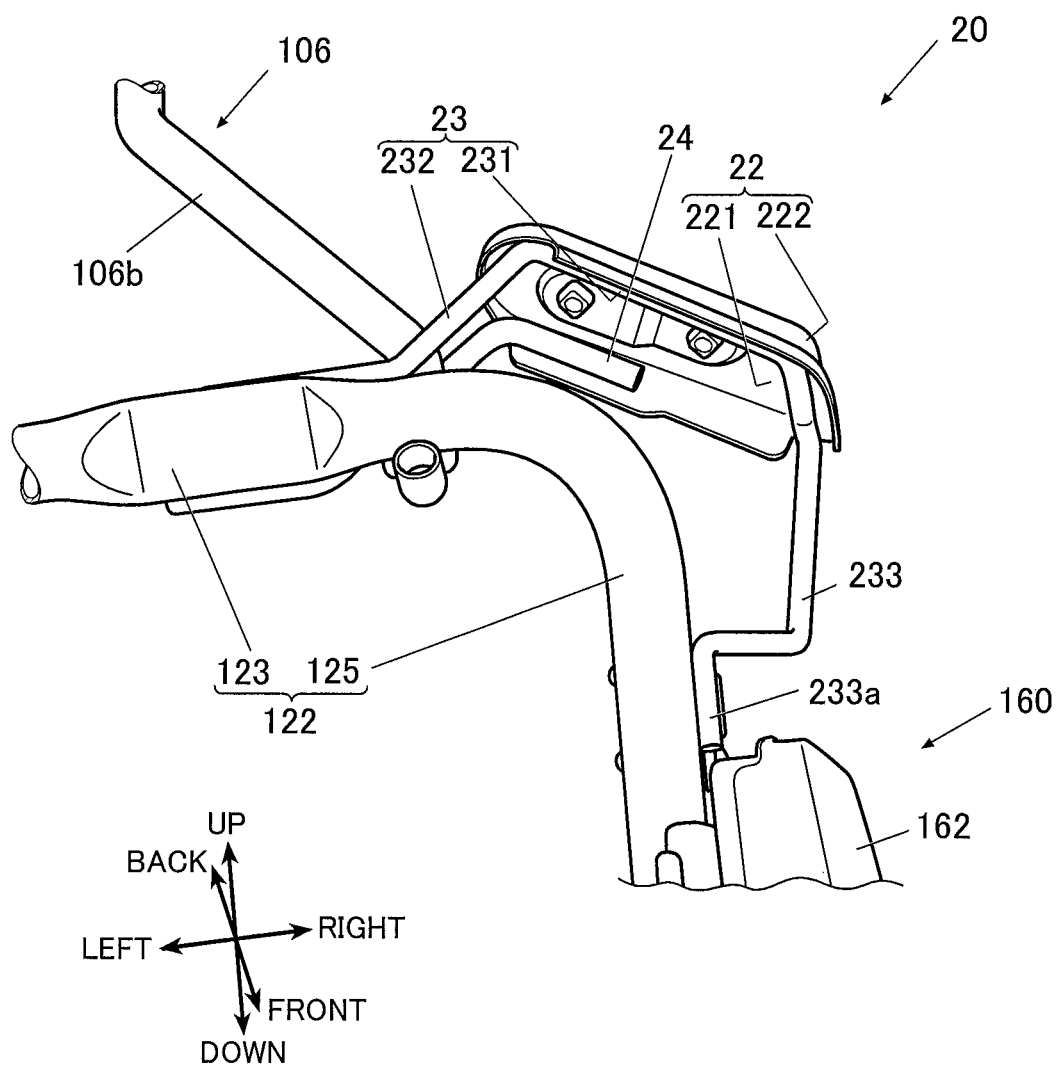
FIG. 6 is a perspective view of the belt guide.

FIG. 4 is an enlarged view of the holding member 7. In FIG. 4, a state where the engaging of the hook shaped protruding unit 72 (after-mentioned) and the to-be-hooked unit 73 (after-mentioned) of the holding member 7 is released is schematically shown.

As shown in FIG. 4, the holding member 7 is fixed by one end thereof being sewed on to the surface material 41 covering the underside surface of the seat cushion unit 1. In particular, one end of the holding member 7 (for example, the end where the hook shaped protruding unit 72 is provided) is fixed at the back left part of the underside surface of the seat cushion unit 1.

Further, for example, the holding member 7 is formed in a long belt shape having a predetermined width, and the holding member 7 forms a loop by extending around the outer circumferences of the harnesses 6. In particular, the holding member 7 includes an elastic unit 71 which elastically changes its shape, the hook shaped protruding unit 72 which is provided at one end of the elastic unit 71, and the to-be-hooked unit 73 where the hook shaped protruding unit 72 engages which is provided at the other end of the elastic unit 71. By the detachable hook shaped protruding unit 72 engaging with the to-be-hooked unit 73, the holding member 7 forms a loop (see FIG. 3).

The elastic unit 71 is formed of an elastic material such as rubber, for example. The one end of the elastic unit 71 where the hook shaped protruding unit 72 is provided is sewed on to the surface material 41 covering the underside surface of the seat cushion unit 1.

The hook shaped protruding unit 72 is, for example, a member whose cross-section is in an approximately "J" shape and the hook shaped protruding unit 72 includes a flat part 72a and a curved part 72b which curves so as to bend back toward the flat part 72a.

The hook shaped protruding unit 72 is fixed to the elastic unit 71 so that the flat part 72a faces the wide surface part of the elastic part 71 at its one end. Further, in a state where the holding member 7 is fixed to the surface material 41 covering the underside surface of the seat cushion unit 1, the curved part 72b of the hook shaped protruding unit 72 faces downward and points diagonally to the left.

As for the material for forming the hook shaped protruding unit 72, for example, resin and the like are suggested. However, this is merely an example and is not limitative in any way and different materials can be used as needed. Further, the above mentioned shape of the hook shaped protruding unit 72 is not limited to the above example and can be modified as needed.

The to-be-hooked unit 73 is, for example, a member formed in an approximately square shape having a rectangular opening 73a. Two side edges of the to-be-hooked unit 73 located on two sides of the opening 73a are sewed on to the elastic unit 71. One side edge close to the other end of the elastic unit 71 (on the left side in FIG. 4) among the two side edges has the other end of the elastic unit 71 wrapped therearound.

The width of the opening 73a in the front-back direction approximately equals to or is wider than the width of the curved part 72b of the hook shaped protruding unit 72 in the front-back direction. Further, the length of the opening 73a in the left-right direction approximately equals to or is longer than the width of the curved part 72b of the hook shaped protruding unit 72.

In such way, the curved part 72b of the hook shaped protruding unit 72 is attachable and detachable to and from the opening 73a of the to-be-hooked unit 73.

As for the material for forming the to-be-hooked unit 73, for example, resin and the like are suggested. However, this is merely an example and is not limitative in any way and different materials can be used as needed. Further, the above mentioned shape of the to-be-hooked unit 73 is not limited to the above example and can be modified as needed.

[Holding Method of Harnesses]

Next, the holding method of the harnessed 6 by using the holding member 7 will be described.

Here, a method for holding three harnesses 6 which are connected to the airbag module 5 and the electronic control unit (not shown) by using the holding member 7 will be described.

In the following description, it is assumed that the one end of the elastic unit 71 of the holding member 7 where the hook shaped protruding unit 72 is provided is sewed on to the surface material 41 covering the underside surface of the seat cushion unit 1 in advance.

First, the airbag module 5 side parts of the three harnesses 6 are disposed so as to extend along an approximate up-down direction in the concave unit 22 which is provided at the lower right end part of the back side of the seat back unit 2. A positioning member 81 formed of a cloth is provided at the border part between the seat back unit 2 and the seat cushion unit 1, for example, and the positioning member 81 makes the three harnesses 6 be disposed along the right side parts of the seat back unit 2 and the seat cushion unit 1.

Further, the electronic control unit side parts of the three harnesses 6 are disposed along the right side part of the underside surface of the seat cushion unit 1 by being bundled by the bundling member 82 at the right hand side of the convex part 31a of the pan frame 31.

Further, the middle parts of the three harnesses 6 which are disposed along the back side and the underside of the vehicle seat 100, in particular, the parts that are disposed more in the back than the convex part 31a of the pan frame 31 of the set cushion unit 1 are held by the holding member 7.

In particular, in the state where the engaging of the hook shaped protruding unit 72 and the to-be-hooked unit 73 is released, the to-be-hooked unit 73 of the holding member 7 is passed through between the three harnesses 6 and the underside surface of the seat cushion unit 1 from the left side and the elastic unit 71 is extended around the harnesses 6 so as to wrap along the outer circumference of the harness 6 located on the most right side. Then, by moving the to-be-hooked unit 73 to the left side, the elastic unit 71 is further disposed under the three harnesses 6.

By engaging the opening 73a of the to-be-hooked unit 73 with the curved part 72b of the hook shaped protruding unit 72 from outside, the opening 73a is hooked to the curved part 72b. Here, since the elastic unit 71 has the stretching property, the part of the elastic unit 71 that faces the surface material 41 covering the seat cushion unit 1 is pulled to the left side and the part of the elastic unit 71 that is folded back after being wrapped along the outer circumferences of the harnesses 6 is pulled to the right side. As a result, by the to-be-hooked unit 73 being pulled to the right side, the hook shaped protruding unit 72 and the to-be-hooked unit 73 are engaged. The middle parts of the three harnesses 6 in the longitudinal direction are pulled to the left side long the underside surface of the seat cushion unit 1.

In such way, the holding member 7 holds the three harnesses 6 in a way so as to avoid the convex unit 31a of the pan frame 31 of the underside surface of the seat cushion unit 1.

As described above, according to the vehicle seat 100 of the embodiment, a part of the holding member 7 is fixed to the surface of the seat main body 100A (for example, to the seat cushion unit 1 or the like) and the holding member 7 forms a loop by being extended around along the outer circumferences of the harnesses 6. Therefore, just by the holding member 7, apart thereof being fixed to the surface of the seat main body 100A, being extended around along the outer circumferences of the harnesses 6, swinging of the harnesses 6 can be controlled and they can be fixated. Further, the fixation mechanism of the harnesses 6 can be simplified by the number of parts being reduced. Especially, since a plurality of harnesses 6 can be fixated by using one holding member 7, increase in the number of holding members 7 due to increase in the number of harnesses can be controlled.

Since the holding member 7 includes the elastic unit 71 which elastically changes its shape, the holding member 7 can be extended around along the outer circumferences of the harnesses 6 by stretching the elastic unit 71. Therefore, the workability of fixation of the harnesses 6 can be improved. Further, by utilizing the stretching property of the elastic unit 71, the harnesses 6 can be fixated in a state where they are biased toward a predetermined direction (for example, to the left side in FIG. 3) and the fixation of the harnesses 6 can be carried out properly.

Since the holding member 7 is a long belt shaped member and forms a loop by the two ends thereof, which are engageable and detachable, being engaged with each other, the holding member 7 can be extended around along the outer circumferences of the harnesses 6 and form a loop by the two ends thereof, which are engageable and detachable, being engaged to each other. In such way, the workability of fixation of the harnesses 6 can be improved.

Since the holding member 7 includes the hook shaped protruding unit 72 at one end thereof and includes the to-be-hooked part 73 where the hook shaped protruding unit 72 engages at the other end thereof, the holding member 7 can form a loop by the hook shaped protruding unit 72 at the one end and the to-be-hooked unit 73 at the other end being engaged with each other. In such way, the workability of fixation of the harnesses 6 can be improved.

Since the harnesses 6 are held so that the middle parts thereof in the longitudinal direction be disposed along the surface of the seat main body 100A, for example, in a case where the middle sections of the harnesses 6 sag due to the harnesses being designed so as to have extra length in order to accommodate various types of vehicle seats 100 of difference sizes, the harnesses 6 can be disposed appropriately along the surface of the seat main body 100A without the middle parts thereof sagging.

Since a part of the holding member 7 is fixed to the underside surface of the seat cushion unit 1, the harnesses 6 can be fixated more appropriately at the underside surface of the seat cushion unit 1 where only a limited space is available for laying the harnesses 6.

Since the harnesses 6 can be held by the holding member 7 so as to avoid the pan frame 31 of the underside surface of the seat cushion unit 1, even in a case where only a limited space is available in the underside surface of the seat cushion unit 1 to lay the harnesses 6 due to the convex part 31a of the pan frame 31, the harnesses 6 can be laid appropriately by them being held by the holding member 7.

The present invention is not limited to the above described embodiment and various modifications and design changes can be carried out within the scope of the invention.

For example, the holding member 7 which is fixed to the underside surface of the seat cushion unit 1 and which holds the harnesses 6 that are disposed along the underside surface of the seat cushion unit 1 is shown as an example. However, such holding member 7 is merely an example and is not limitative in any way. The holding member 7 may be fixed to any part of the seat main body 100A as long as it is fixed on the surface of the seat main body 100A. Similarly, the harnesses 6 which are to be held by the holding member 7 may be disposed at different locations as needed.

In the above described embodiment, the holding member 7 including the elastic unit 71 is shown as an example. However, such holding member 7 is merely an example and is not limitative in any way. The elastic unit 71 can be included as needed.

Further, the holding member 7 is fixed by one end thereof being sewed on to the surface material 41 covering the underside surface of the seat cushion unit 1. However, such method is merely an example and is not limitative in any way. The fixing method of the holding member 7 can be modified as needed.

In the above described embodiment, a front seat in the front part of the vehicle is shown and described as the vehicle seat 100. However, this is merely an example and is not limitative in any way. The present invention can be applied to a seat in the back of the vehicle or the like as needed.

According to a first aspect of the preferred embodiment of the present invention, there is provided a vehicle seat according to the invention described in claim 1 includes a seat main body in which an electric component is installed, a harness which is disposed along a surface of the seat main body and which is connected to the electric component and a holding member which holds the harness, and a part of the holding member is fixed to the surface of the seat main body and the holding member forms a loop by being extended around along the outer circumference of the harness.

According to the present invention, just by the holding member, a part thereof being fixed to the surface of the seat main body, being extended around along the outer circumferences of the harness, swinging of the harness can be controlled and it can be fixated. Further, the fixation mechanism of the harness can be simplified by the number of parts being reduced. Especially, since a plurality of harnesses can be fixated by using one holding member, increase in the number of holding members due to increase in the number of harnesses can be controlled.

Preferably, the holding member includes an elastic unit which elastically changes a shape thereof.

According to the present invention, the holding member can be extended around along the outer circumference of the harness by stretching the elastic unit. Therefore, the workability of harness fixation can be improved. Further, by utilizing the stretching property of the elastic unit, the harness can be fixated in a state where they are biased toward a predetermined direction.

Preferably, the holding member is a long belt shaped member which forms the loop by two ends, which are engageable and detachable, being engaged with each other.

According to the present invention, the long belt shaped holding member can be extended around along the outer circumference of the harness and can form a loop by the two ends thereof, which are engageable and detachable, being engaged to each other. In such way, the workability of harness fixation can be improved.

Preferably, a hook shaped protruding unit is provided at one end of the holding member and a to-be-hooked unit where the hook shaped protruding unit is engaged is provided at the other end of the holding member.

According to the present invention, the holding member can form a loop by the hook shaped protruding unit at the one end and the to-be-hooked unit at the other end being engaged with each other. In such way, the workability of harness fixation can be improved.

Preferably, the holding member holds the harness so that a middle part of the harness in a longitudinal direction is disposed along the surface of the seat main body.

According to the present invention, since the harness is held so that the middle part thereof in the longitudinal direction be disposed along the surface of the seat main body, for example, in a case where the middle section of the harness sags due to the harness having extra length, the harness can be disposed appropriately along the surface of the seat main body without the middle part thereof sagging.

Preferably, the seat main body includes a seat cushion unit, and a part of the holding member is fixed to the underside surface of the seat cushion unit.

According to the present invention, since a part of the holding member is fixed to the underside surface of the seat cushion unit, the harness can be fixated more appropriately at the underside surface of the seat cushion unit where only a limited space is available for laying the harness.

Preferably, the holding member holds the harness such that the harness avoids a pan frame of the underside surface of the seat cushion unit.

According to the present invention, since the harness can be held by the holding member so as to avoid the pan frame of the underside surface of the seat cushion unit, even in a case where only a limited space is available in the underside surface of the seat cushion unit to lay the harness due to the pan frame, the harness can be laid appropriately by being held by the holding member.

The entire disclosure of U.S. Provisional Patent Application No. 62/245,668 filed on Oct. 23, 2015 including description, claims, drawings, and abstract are incorporated herein by reference in its entirety.

What is claimed is:

1. A vehicle seat, comprising:
a seat main body in which an electric component is installed;
a harness that is disposed along a surface of the seat main body and that is connected to the electric component;
a holding member that holds the harness and comprises (i) a long, belt shaped elastic unit that elastically changes a shape thereof and (ii) first and second engageable ends that are engaged with each other; and
a seat cushion unit,
wherein:
relative to a middle of an underside surface of the seat cushion unit, the harness is on a first side of the seat main body,
the first end of the holding member is fixed to the underside surface of the seat cushion unit on a second side of the seat main body opposite the first side,
the holding member forms a loop by being extended around along the outer circumference of the harness, and
as a result of the elastic change in shape of the elastic unit, the holding member pulls the harness toward the first end fixed to the underside surface of the seat cushion unit.

2. The vehicle seat of claim 1, wherein a hook shaped protruding unit is provided at the first end of the holding member and a to-be-hooked unit where the hook shaped protruding unit is engaged is provided at the second end of the holding member.

3. The vehicle seat of claim 1, wherein the holding member holds the harness so that a middle part of the harness in a longitudinal direction is disposed along the surface of the seat main body.

4. The vehicle seat of claim 1, wherein the holding member holds the harness such that the harness avoids a pan frame of the underside surface of the seat cushion unit.

5. The vehicle seat of claim 1, wherein the holding member pulls the harness toward the middle of the underside surface of the seat cushion unit.

6. The vehicle seat of claim 1, wherein an inner circumference of the belt shaped elastic unit is greater than the outer circumference of the harness.

7. The vehicle seat of claim 1, wherein the first and second sides of the seat main body are opposite in a left-right direction.

8. The vehicle seat of claim 7, wherein the harness extends in a front-back direction.

\* \* \* \* \*